United States Patent
Mukherjee (10) Patent No.: US 8,949,671 B2
(45) Date of Patent: Feb. 3, 2015

(54) FAULT DETECTION, DIAGNOSIS, AND PREVENTION FOR COMPLEX COMPUTING SYSTEMS

(75) Inventor: Maharaj Mukherjee, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 620 days.

(21) Appl. No.: 12/022,453

(22) Filed: Jan. 30, 2008

(65) Prior Publication Data

US 2009/0193298 A1    Jul. 30, 2009

(51) Int. Cl.
*G06F 11/00* (2006.01)
*G06F 11/07* (2006.01)

(52) U.S. Cl.
CPC ........ *G06F 11/0766* (2013.01); *G06F 11/0718* (2013.01)
USPC .............................. 714/38.1; 714/26; 714/47.1

(58) Field of Classification Search
CPC .............. G06F 11/079; G06F 11/3409; G06F 11/0793; G06F 8/71; G06F 11/3466; G06F 11/366; G06F 11/3612; G06F 11/321; G06F 11/00
USPC ............................... 714/38, 47, 26, 38.1, 47.1
See application file for complete search history.

(56) References Cited

U.S. PATENT DOCUMENTS

| | | | |
|---|---|---|---|
| 5,862,322 A * | 1/1999 | Anglin et al. .................... | 714/57 |
| 6,148,417 A * | 11/2000 | da Silva ........................... | 714/25 |
| 6,163,858 A * | 12/2000 | Bodamer ......................... | 714/34 |
| 6,314,555 B1 * | 11/2001 | Ndumu et al. ................ | 717/101 |
| 6,438,749 B1 * | 8/2002 | Chamberlain ................ | 717/174 |
| 6,593,940 B1 | 7/2003 | Petersen et al. | |
| 6,826,717 B1 * | 11/2004 | Draper et al. ................... | 714/39 |
| 6,862,696 B1 | 3/2005 | Voas et al. | |
| 6,883,120 B1 * | 4/2005 | Banga ......................... | 714/47.1 |
| 6,918,059 B1 * | 7/2005 | Galuten et al. .................. | 714/31 |
| 6,948,094 B2 * | 9/2005 | Schultz et al. ................. | 714/15 |
| 6,952,662 B2 * | 10/2005 | Wegerich et al. ................ | 703/2 |
| 7,020,595 B1 * | 3/2006 | Adibhatla et al. ............... | 703/7 |
| 7,047,522 B1 * | 5/2006 | Dixon et al. .................. | 717/131 |
| 7,142,959 B2 * | 11/2006 | Oesterling et al. .......... | 701/32.4 |
| 7,239,978 B2 * | 7/2007 | Cheng et al. ................. | 702/185 |
| 7,349,746 B2 * | 3/2008 | Emigholz et al. ............... | 700/21 |
| 7,386,850 B2 * | 6/2008 | Mullen ......................... | 718/104 |
| 7,457,581 B2 * | 11/2008 | Stout et al. .................... | 434/353 |
| 7,583,754 B2 * | 9/2009 | Liu ............................... | 375/297 |
| 7,640,454 B1 * | 12/2009 | Botes ............................. | 714/19 |
| 7,660,705 B1 * | 2/2010 | Meek et al. ...................... | 703/2 |
| 7,680,957 B1 * | 3/2010 | Ketterhagen et al. ......... | 709/246 |
| 7,685,574 B2 * | 3/2010 | Brumme et al. .............. | 717/130 |

(Continued)

*Primary Examiner* — Loan L. T. Truong
(74) *Attorney, Agent, or Firm* — Cantor Colburn LLP; William Steinberg (57) ABSTRACT

A method is provided for diagnosing failures in an object-oriented software system. The method comprises collecting runtime diagnostic information; maintaining a record of the diagnostic information in a storage buffer; and dynamically updating the record of the diagnostic information to include a group of the diagnostic information collected over a most recent occurrence of a predetermined interval. The diagnostic information includes at least one set of call stack information for at least one currently running application and at least one set of other information. Each of the at least one set of other information is selected from a set of memory access information, a set of data access information, and a set of paging information for each currently executing process.

28 Claims, 3 Drawing Sheets

(56) References Cited

U.S. PATENT DOCUMENTS

| | | | |
|---|---|---|---|
| 7,730,364 B2 * | 6/2010 | Chang et al. | 714/47.2 |
| 7,890,796 B2 * | 2/2011 | Pawar et al. | 714/6.13 |
| 8,161,010 B2 * | 4/2012 | Weissman et al. | 707/661 |
| 2001/0014886 A1 * | 8/2001 | Ross et al. | 706/45 |
| 2001/0027350 A1 * | 10/2001 | Koga et al. | 700/95 |
| 2002/0019870 A1 * | 2/2002 | Chirashnya et al. | 709/224 |
| 2002/0138457 A1 * | 9/2002 | Jin et al. | 706/26 |
| 2002/0183971 A1 * | 12/2002 | Wegerich et al. | 702/185 |
| 2002/0184065 A1 * | 12/2002 | Menard et al. | 705/7 |
| 2002/0184166 A1 * | 12/2002 | Jackson et al. | 706/14 |
| 2003/0005414 A1 | 1/2003 | Elliott et al. | |
| 2003/0023656 A1 * | 1/2003 | Hutchison et al. | 709/100 |
| 2003/0033178 A1 * | 2/2003 | Black et al. | 705/7 |
| 2004/0006471 A1 * | 1/2004 | Chiu | 704/260 |
| 2004/0034456 A1 * | 2/2004 | Felke et al. | 701/29 |
| 2004/0073096 A1 * | 4/2004 | Kates et al. | 600/300 |
| 2004/0167731 A1 * | 8/2004 | Wang et al. | 702/60 |
| 2004/0215999 A1 * | 10/2004 | Otto et al. | 714/4 |
| 2004/0216091 A1 * | 10/2004 | Groeschel | 717/128 |
| 2005/0066235 A1 | 3/2005 | Lange-Last | |
| 2005/0071037 A1 * | 3/2005 | Strang | 700/121 |
| 2005/0073973 A1 * | 4/2005 | Laroia et al. | 370/329 |
| 2005/0120273 A1 * | 6/2005 | Hudson et al. | 714/38 |
| 2005/0268301 A1 * | 12/2005 | Kelley et al. | 718/100 |
| 2005/0273490 A1 * | 12/2005 | Shrivastava et al. | 709/203 |
| 2006/0048013 A1 * | 3/2006 | Barsness et al. | 714/38 |
| 2006/0064578 A1 * | 3/2006 | Chandramouleeswaran et al. | 713/100 |
| 2006/0075306 A1 * | 4/2006 | Chandrasekaran | 714/38 |
| 2006/0080569 A1 * | 4/2006 | Sciacca | 714/4 |
| 2006/0101401 A1 * | 5/2006 | Brumme et al. | 717/124 |
| 2006/0101402 A1 * | 5/2006 | Miller et al. | 717/124 |
| 2006/0150008 A1 * | 7/2006 | Srinivas et al. | 714/12 |
| 2006/0233115 A1 * | 10/2006 | Matityahu et al. | 370/252 |
| 2006/0250948 A1 * | 11/2006 | Zamfir et al. | 370/216 |
| 2006/0253745 A1 * | 11/2006 | Maso et al. | 714/47 |
| 2007/0028220 A1 * | 2/2007 | Miller et al. | 717/124 |
| 2007/0038896 A1 | 2/2007 | Champlin et al. | |
| 2007/0074076 A1 * | 3/2007 | Imai et al. | 714/26 |
| 2007/0100900 A1 * | 5/2007 | Gibbins | 707/201 |
| 2007/0128899 A1 * | 6/2007 | Mayer | 439/152 |
| 2007/0201654 A1 * | 8/2007 | Shenfield | 379/201.01 |
| 2007/0239717 A1 * | 10/2007 | Thrash et al. | 707/7 |
| 2007/0274268 A1 * | 11/2007 | Axelsson et al. | 370/338 |
| 2008/0002590 A1 * | 1/2008 | Thomas et al. | 370/242 |
| 2008/0195369 A1 * | 8/2008 | Duyanovich et al. | 703/22 |
| 2008/0249781 A1 * | 10/2008 | Reddy et al. | 704/270.1 |
| 2008/0276128 A1 * | 11/2008 | Lin et al. | 714/45 |
| 2009/0083632 A1 * | 3/2009 | Brosh et al. | 715/733 |
| 2009/0215447 A1 * | 8/2009 | Catalano et al. | 455/432.1 |

\* cited by examiner

FAULT DETECTION, DIAGNOSIS, AND PREVENTION FOR COMPLEX COMPUTING SYSTEMS

BACKGROUND OF THE INVENTION

1. Field of the Invention

Exemplary embodiments of the present invention relate to software diagnostics, and more particularly, to diagnostics for the interactions between objects in a complex software system.

2. Description of Background

A software system is a system based on software components that form part of a computer system, which is a configuration of functional units (that is, hardware, software, firmware, resources, etc.) according to their nature, number, and chief characteristics. The details of a configuration, including how software systems are implemented therewithin, affects system function and performance. A software component is a system element that offers a predefined service and is able to communicate with other components. Software systems, which can be very large and complex, are typically described in terms of software architectures that specify the software components comprising the systems, the externally visible properties of those components, and the interactions or relationships between those components.

Object-oriented design is a software engineering methodology in which a software system is modeled as a group of interacting objects, rather than a collection of procedures. Each object in an object-oriented system is characterized by its class, state (that is, data elements), and its behavior, and encompasses encapsulated data and procedures that are grouped together, along with an 'object interface' that defines how to interact with the object, to represent some independent entity having a distinct role or responsibility in the system being modeled. Thus, an object-oriented software system is described by the interaction between the objects, and the behavior of the system results from the collaboration of the objects.

As the complexity of software systems increases, so too does the difficulty of identifying the source of failures in the system. Software failures are caused by errors (also known as bugs) that prevent the system from behaving as intended. Many bugs arise from oversights and errors made during design, coding, and data entry. Bugs can have a wide variety of effects, with varying levels of inconvenience. While some bugs may have only a subtle effect on a system's functionality and thus lie undetected for some time, more serious bugs may cause the system or applications running within the system to crash or freeze, leading to a denial of service.

The objects in an object-oriented software system are typically designed and tested for bugs either individually or in small groups during deployment. Nevertheless, this level of testing fails to consider any implementation constraints that might exist, such as concurrency, distribution, persistence, how the system is to be built, or how the system is to be implemented in different computing configurations, and, as a result, is generally insufficient to capture integration errors, performance problems, and other system-wide issues that result from the complex interactions between different objects in large, software systems implementing multitasking or other forms of concurrency control, such as operating systems or database systems. Often, rather than simply arising from individual problems with the objects themselves, many more complex bugs arise from unintended interactions between different objects in a software system. Computer program code can be complex—millions of lines long in some cases—often having been programmed by many people over a great length of time, so that programmers are unable to mentally track every possible way in which objects can interact. Furthermore, software systems tend to increase in complexity as they evolve over time (for example, due to additions and/or deletions of objects), and software systems are sometimes deployed in configurations in a manner that is different from what was originally planned and for which testing was performed.

Bugs that can arise from unexpected consequences of the interactions between objects of a software system are not captured during the initial testing of the objects and will only manifest during runtime. For instance, in a system that comprises a set of objects for which no errors were identified during testing, unforeseen problems related to interactions between the objects such as boundary conditional exceptions and failures relating to timing, load, and configuration mismatch issues may still arise. Presently, however, it is a challenge to reliably correlate and/or diagnose failures that occur in software systems as a result of the interactions between objects. This is especially challenging because of the complexities involved in reproducing these types of problems, as reproduction is a typical first step in locating a bug. For instance, even if a system executes the same sequence of operations that had previously caused a failure a second time, the timing of events during the second execution of these operations may vary in a way such that the underlying error does not affect performance of the system.

SUMMARY OF THE INVENTION

The shortcomings of the prior art can be overcome and additional advantages can be provided through exemplary embodiments of the present invention that are related to a method for diagnosing failures in an object-oriented software system. The method comprises collecting runtime diagnostic information; maintaining a record of the diagnostic information in a storage buffer; and dynamically updating the record of the diagnostic information to include a group of the diagnostic information collected over a most recent occurrence of a predetermined interval. The diagnostic information includes at least one set of call stack information for at least one currently running application and at least one set of other information. Each of the at least one set of other information is selected from a set of memory access information, a set of data access information, and a set of paging information for each currently executing process.

The shortcomings of the prior art can also be overcome and additional advantages can also be provided through exemplary embodiments of the present invention that are related to diagnostic systems, computer program products, and data processing systems corresponding to the above-summarized method are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution that can be implemented to capture failures that arise in software systems during runtime as a result of complex interactions between objects, to aid in reproducing these failures for diagnostic purposes, and to identify critical conditions resulting from these complex interactions that may lead to future system failures.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description of exemplary embodiments of the present invention taken in conjunction with the accompanying drawings in which:

The detailed description explains exemplary embodiments of the present invention, together with advantages and features, by way of example with reference to the drawings. The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

DETAILED DESCRIPTION OF EXEMPLARY EMBODIMENTS

While the specification concludes with claims defining the features of the invention that are regarded as novel, it is believed that the invention will be better understood from a consideration of the description of exemplary embodiments in conjunction with the drawings. It is of course to be understood that the embodiments described herein are merely exemplary of the invention, which can be embodied in various forms. Therefore, specific structural and functional details disclosed in relation to the exemplary embodiments described herein are not to be interpreted as limiting, but merely as a representative basis for teaching one skilled in the art to variously employ the present invention in virtually any appropriate form. Further, the terms and phrases used herein are not intended to be limiting but rather to provide an understandable description of the invention.

Exemplary embodiments of the present invention can be implemented to provide a method, system, and apparatus for failure diagnosis and prevention for use with software systems. Exemplary embodiments can be implemented to capture failures that arise in complex software systems as a result of interactions between objects during runtime deployment, to aid in reproducing these failures for diagnostic purposes, and to identify critical conditions resulting from these complex interactions that may lead to future system failures. In exemplary embodiments, a software system can be implemented with modular diagnostic software components or modules that are configured to perform, as will described in greater detail below, techniques for: (1) gathering and collecting configuration and system information that is relevant to failures that arise as a result of interactions between objects in the software system; (2) evaluating this collected information to diagnose these types of failures; and (3) evaluating the collected information to aid in predicting and preventing future occurrences of these types of failures. Exemplary embodiments can be implemented as, for example, "off-line" diagnostic programs that are run outside of the primary software system or background diagnostic programs. Exemplary embodiments can be implemented to perform dynamic analysis to provide for failure diagnosis and prevention. By relying on dynamic analysis, the components need not make conservative assumptions as to the behavior of the system being analyzed, as the act of program execution within the system generates the exact behavior of the system.

In exemplary embodiments, a software system implementing the techniques described herein can be any software application running on a computer, including but not limited to, an operating system, a database management system, an e-mail server, a Web server, a middle-tier application server, a firewall server, and a client-side software application. Thus, it should of course be noted that the scope present invention is not limited to implementations within the systems of the exemplary embodiments described herein. The techniques disclosed herein are suitable for implementation within any of a variety of software systems and/or architectures. Furthermore, in exemplary embodiments, the software system need not implement all three of the techniques described above. For example, the software system can be implemented to perform any of the three techniques individually, to perform any combination or subset of the three techniques, or to perform any of the three techniques in combination with other techniques that may involve human intervention.

Figure 1:
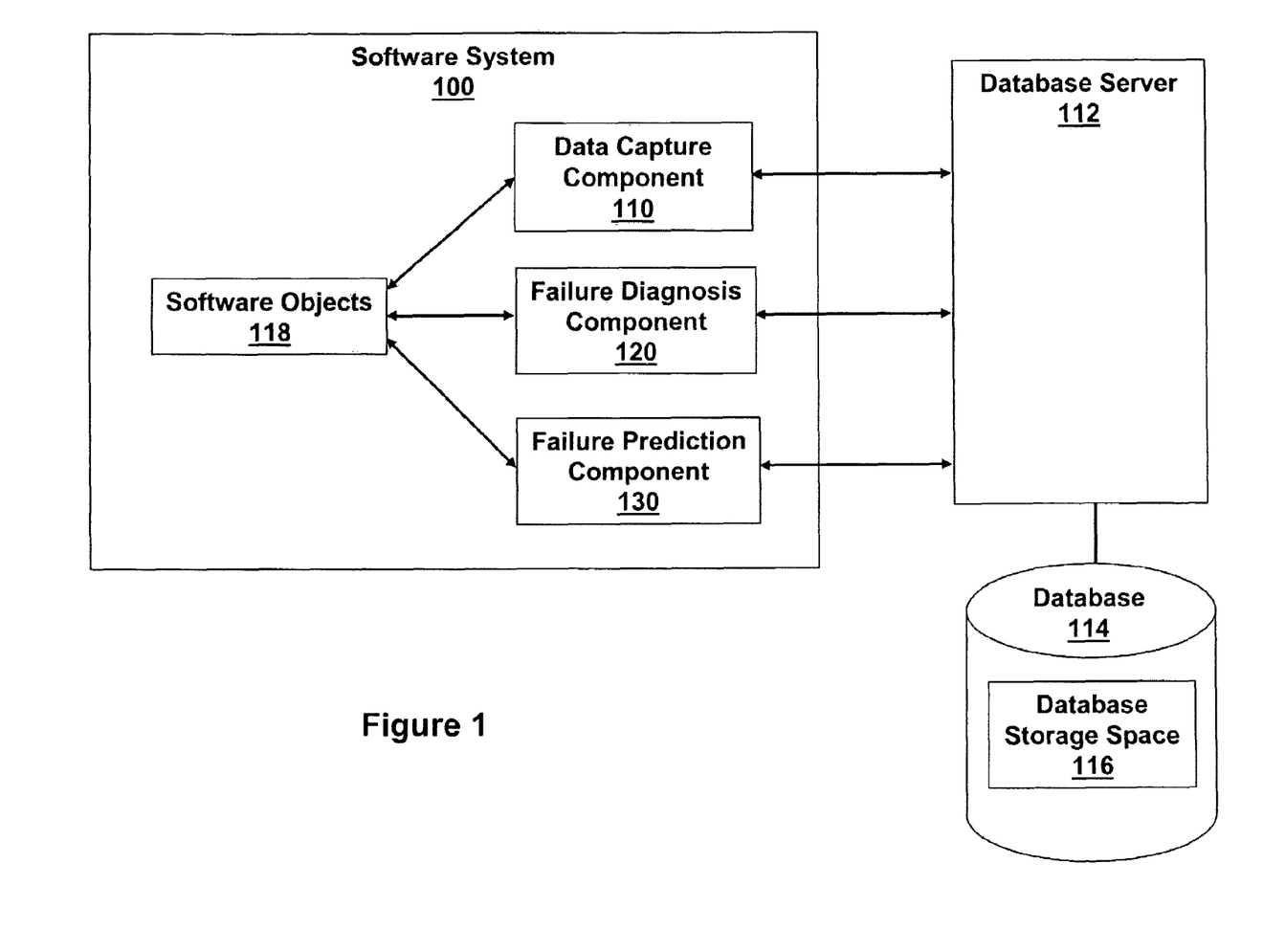
FIG. 1 is a block diagram illustrating an exemplary software system implementing diagnostic techniques in accordance with an exemplary embodiment of the present invention.

Referring now to FIG. 1, a block diagram depicting an exemplary embodiment of a software system 100 configured to perform failure detection and prevention is illustrated. Exemplary software system 100 is configured to be implemented within any suitable computing system configuration. Software system 100 is communicatively coupled to a database server 112 and includes one or more software objects 118 with their associated data. Software objects 118 may include pieces of software such as, for example, software applications, driver files, APIs, text files, executable files, or any other computer readable instructions, data structures, or software modules. Software system 100 also includes a data capture component 110, a failure diagnosis component 120, and a failure prediction component 130.

Data capture component 110, failure diagnosis component 120, and failure prediction component 130 are software components or modules that may be implemented in any suitable manner, including but not limited to, one or more libraries of functions, one or more plug-in modules, and one or more dynamic link-libraries. During execution, data capture component 110, failure diagnosis component 120, and failure prediction component 130 can be initiated in any suitable manner, including but not limited to, one or more separate processes within the address space of software system 100, one or more threads of the same process within the software system, one or more daemons within the software system, and one or more services running outside the address space of the software system.

Software system 100 is configured to perform concurrency control for multiple concurrently executing and interacting computational tasks (for example, in an operating system, a multiprocessor system, or a database management system). In exemplary embodiments, these tasks may be executing on a single processor, several processors in close proximity, or distributed across a network. The tasks may be implemented as separate programs, or as a set of processes or threads created by a single program. A process is an instance of a set of computer instructions that are being sequentially executed. In exemplary embodiments in which software system 100 supports multithreading, each process can have several threads of execution that share the same program code, system resources (such as memory and file access), address space, and file access permissions. This multithreading can occur by time slicing, wherein a single processor switches between different threads. A process may thus split itself into multiple threads that execute in parallel, running different instructions on much of the same resources and data without the extra overhead needed to create and handle synchronized communication between new processes.

In exemplary embodiments, each process running on software system 100 can include information such as an image of the executable machine code associated with a program, memory, operating system descriptors of resources that are allocated to the process, security attributes, and processor state. This information can be stored in computer registers when the process is executing and in memory otherwise. The memory for each process can be some region of virtual memory (which allows for blocks of memory values to actually be on disk and not in main memory at any time) and include the executable code, process-specific data (input and output), a call stack (to keep track of active subroutines and/or other events), and a heap to hold intermediate computation data generated during run time. A call stack can be used keep track of the return address to which an active subroutine should return control when it finishes executing, as well as local data storage and parameter passing. There may be one call stack associated with each thread of an active process, and there may be additional stacks created for signal handling and/or cooperative multitasking, described below. Software system 100 can hold most of the information about active processes in data structures called process control blocks (PCB). Any subset of resources, and generally the processor state, may be associated with each of the process' threads in exemplary embodiments in which software system 100 supports multithreading. Software system 100 can be configured to keep its processes separated and to allocate the resources used by the processes so that the processes are less likely to interfere with each other and cause system failures (for example, deadlock or thrashing). Software system 100 may also provide mechanisms for inter-process communication.

In exemplary embodiments, software system 100 can be configured to perform concurrent computing by implementing multitasking. Multitasking is a method by which multiple executing tasks (for example, processes or threads) share common processing resources such as one or more CPUs, memory devices, and/or I/O devices. In the case of a computer with a single CPU, only one task is said to be running at any point in time, meaning that the CPU is actively executing instructions for that task. On multiprocessor machines that have more than one CPU, multitasking allows many more tasks to be run than there are CPUs. Multitasking utilizes scheduling to determine which task is currently running at any given time, and when another waiting task gets a turn, by assigning priorities to waiting tasks in a priority queue.

The act of reassigning a CPU state (that is, the context, which is the current configuration information in the machine) from a first process to a second one such that multiple processes can share a single CPU resource is called a context switch. In a context switch, the state of the first process, which includes all registers that the process may be using, especially the program counter, along with memory used by the process, any other operating system specific data that may be necessary, is stored in a PCB. Generally, the PCB will also include an identifier for the process, the address space for the process, the priority for the process, other process information, and a pointer to the PCB of the next process to run. Then, execution of the first process is suspended, and the PCB and context of the second process is loaded for execution. In exemplary embodiments, context switching can be performed primarily by software, primarily by hardware, or by a combination thereof.

Much of the complexity in concurrent computing that can lead to failures comes from the need to coordinate access to computing resources that are shared between tasks (including communications mediums), to synchronize the operation of co-operating tasks, and to correctly sequence the interactions or communications between different tasks. For example, certain concurrent components may communicate by altering the contents of shared memory locations, which can entail the application of some form of locking between threads, while other concurrent components may communicate by exchanging messages. In multithreading systems, because every thread has access to virtually all the memory of every other thread, problems such as race conditions and other non-intuitive behaviors can arise. For example, the system may make a context switch an inappropriate time. For data to be correctly manipulated, threads will often need to rendezvous in time in order to process the data in the correct order, and threads must also prevent common data from being simultaneously modified, or read while in the process of being modified (which can lead to deadlocks). Furthermore, interface incompatibility can arise in situations in which one software component provides a service to another, such as when there is a change in the order of parameters between a software component requesting service and the component providing the service. Another concern is performance incompatibility, which can arise when multiple programs are running on the same computer system configuration, and the presence of one will inhibit the performance of another. This form of incompatibility can occur if the two programs are intended to cooperate, but can also occur if they are completely unrelated but just happen to run at the same time. For some programs, performance compatibility may depend on the configuration in which they are run.

Other concerns that may lead to failures can arise in systems that utilize virtual memory. Virtual memory is a technique which gives a program the impression that it has contiguous working memory, while in fact it is physically fragmented and may even overflow on to disk storage. A virtual memory implementation will generally use page tables divide the virtual address space of an application into blocks of contiguous virtual memory addresses known as pages. Each entry in a page table generally includes the starting virtual address of the page, which can be either the real memory address at which the page is actually stored or an indicator that the page is currently held in a disk file. The process of saving inactive virtual memory pages to disk and restoring them to real memory when required is known as paging. Page faults can arise when a program accesses a page that is mapped in address space, but not loaded in physical memory, and protection faults can arise when programs attempt invalid page accesses (for example, by trying to illegally access memory that is allocated to another process, trying to write to read-only pages, or trying to modify privileged pages). Illegal memory accesses and invalid page faults can degrade the performance of a program or system and can cause failures. Performance incompatibility is also a concern as systems that utilize virtual memory, as disk thrashing can occur, in which one or both programs will have significantly reduced performance.

In the present exemplary embodiment, data capture component 110 is responsible for gathering diagnostic information from system 100 that is relevant to failures that may arise as a result of interactions between objects in the software system. The diagnostic information can, for example, be generated by software objects 118 executing on software system 100. While various types of diagnostic information related to multithreading and/or multitasking environments can be collected by data capture component 110 in exemplary embodiments, the diagnostic information will include at least one set of set of call stack information for at least one software application that is currently running in the system, as well as at least one set of memory access information, data access information, and/or paging information for one or more currently running threads and/or processes. Each set of call stack information collected includes a pointer to a current object instance for the corresponding currently running application. As a result, it is not necessary to capture the actual line of code being run in the diagnostic information. Rather, this can be determined during diagnosis from the call stack information and the pointer to the object code. In exemplary embodiments, the specific diagnostic information that is gathered by data capture component 110 can be specified according to configuration information, which can, for example, be received from a user.

In exemplary embodiments, the set of call stack information for a currently running application can include, for example, the return addresses for subroutines being executed, local data storage, parameter values, evaluation stacks, pointers to the current instances, enclosing subroutine contexts, and other return states. Though the call stack information is an important aspect of this diagnostic information, often, the chances or causes of a failure cannot be conclusively diagnosed from just the call stack. For example, two failures may have identical call stack information, but one of the failures may be the result of a paging problem, while the other the result of a bad data access among threads. Therefore, maintaining a record for these parameters for currently running threads and/or processes is important to diagnosing failures related to interactions between objects in software system 100. The overhead for recording the memory and data access information and paging information for each running thread and process can be minimized using careful coding. In exemplary embodiments, the diagnostic information can further include parameters such as system configuration information, resource usage information, and scheduling information for one or more running threads and/or processes.

Database server 112 is operatively coupled to, and manages, one or more databases, such as database 114. Database 114 comprises a repository 116 that is configured to automatically receive and store diagnostic information as it is gathered by data capture component 110, as well as other information about failure conditions detected in software system 100. Database server 112 is entrusted with the tasks of automatically creating a record of the information gathered by data capture component 110, with saving and managing this record in repository 116, and with saving and managing other information related to failure conditions that arise as a result of interactions between the objects of software system 100. In alternative exemplary embodiments, data capture component 110 can be configured to log the record of diagnostic information in a log trace file.

In exemplary embodiments, database server 112 allocates the storage space for the record of information gathered by data capture component 110 according to configuration information, which can, for example, be received from a user. This configuration information can specify, for example, a maximum size for the storage space, a maximum number of call stack changes, or a maximum length of time. In exemplary embodiments, the storage space for the record can be organized as a circular buffer so that when database server 112 recognizes that the storage space is full (for example, when the maximum size, number of call stack changes, or length of time has been reached), the database server automatically records the current information gathered by data capture component 110 over the oldest information existing in the storage space for the record. Thus, database server 112 can be configured to create and maintain a record of all configuration information, call stack information, memory and data access information, paging information for each thread and/or process, etc. that has been gathered by data capture component 110 over, for example, the most recent occurrence of a given time period (for example, for one minute, two minutes, five minutes, etc.) or the most recent of a given number of changes in the call stack while the software system is running.

In exemplary embodiments, software objects 118 of software system 100 can include application software that can be executed to detect any of a variety of different failure conditions related to interactions between the objects. Examples of detectable failure conditions can include, but are not limited to, paging problems, data access violations, memory existing in an inconsistent state, sudden impact from large resource usages, deadlock, thrashing, race conditions, and the like. In exemplary embodiments, the mechanisms for detecting and reporting failures within the software system can vary. For example, the computer operating system can be configured to send a notification, such as an exception, to an application indicating that a fault condition has occurred. Alternatively, the application software itself can be configured to detect an internal fault condition.

In the present exemplary embodiment, upon detection of a problem within the system, failure diagnosis component 120 is configured to access and evaluate the current record of diagnostic information gathered by data capture component 110 and maintained by database server 112 to attempt to localize the source of the problem. If failure diagnosis component 120 is able to localize the problem, database server 120 can be configured to allow administrators or an internal analysis system (operated by, for example, a human expert) for system 100 to view the entire current record of information gathered across the system by data capture component 110 to attempt to uniquely identify and categorize the specific interaction(s) between the objects of the system that is or are the source of the problem. Database server 112 can also be configured to send or upload the record to an outside analysis system (operated by, for example, a human expert associated with the developer and/or entity that is administering the software system), and the outside analysis system can analyze the information in the record to attempt to uniquely identify and categorize the specific interaction(s) between the objects of the system that is or are the source of the problem. In exemplary embodiments, software system 100 can be further configured to implement techniques such as data mining and correlation to sort the information in the record and/or extract relevant information from the record before the record is presented to the outside evaluation system for analysis.

In the present exemplary embodiment, failure prediction component 130 is configured to access and utilize the record of information gathered by data capture component 110 and maintained by database server 112 to create a record of information related to occurrences of resource stress during normal runtime operation. More specifically, during normal runtime operation of the system, failure prediction component 130 can be implemented to record a snapshot of information related to the components of the present system configuration and the interactions between the software objects 118 at that instant whenever any of a set of key system resource parameters for the configuration is stressed beyond a predetermined threshold. Examples of such parameters can include CPU utilization for one or more processors, memory utilization of logical and physical memory, page file usage, disk I/O utilization, the number of processes or threads concurrently being executed, length of the wait list for data access, network throughput, etc. Failure prediction component 130 can be configured, for example, to use resource handles for the various system resources or condition handlers to monitor the resources for stress conditions. Database server 112 can be configured to receive these stress condition snapshots and maintain a record of the snapshots in repository 116.

Stress conditions that occur during normal runtime operations can be indicative of problems that can result when the system endures too much stress, particularly as a result of concurrent operations. For example, a stress condition may be indicative of thrashing, which is a situation in which increasing resources are used to do a decreasing amount of work, such as when two or more processes are accessing a shared resource such that serious system performance degradation occurs because the system is spending a disproportionate amount of time just accessing the shared resource. Thus, the record of snapshots that are captured by failure prevention component 130 during more stressful runtime conditions can be utilized to predict and prevent system failures that are related to interactions between objects. In an exemplary embodiment, for instance, failure prevention component 130 can be further configured to utilize the record of snapshots to perform regular regression testing. Such testing is used to uncover regression bugs, which occur whenever a software system that previously worked as desired stops working or no longer works as it should.

In further exemplary embodiments, failure prevention component 130 can be further configured to utilize the record of snapshots to create a failure model of data clusters for system configurations during stressful conditions. Failure prevention component 130 can be configured to select the specific diagnostic information used in creating the failure model, and the failure model can be implemented to classify according to the type and category of stress conditions. For example, when enough stress condition snapshots have been generated, failure prevention component 130 can be configured to extrapolate the snapshot data into the data clusters of the failure model according to a multivariate normal distribution to localize failure conditions within these clusters. Failure prevention component 130 could also be configured to dynamically update the failure model of snapshot data clusters upon changes to the system configuration, and database server 112 can be configured to maintain the failure model in repository 116.

Figure 2:
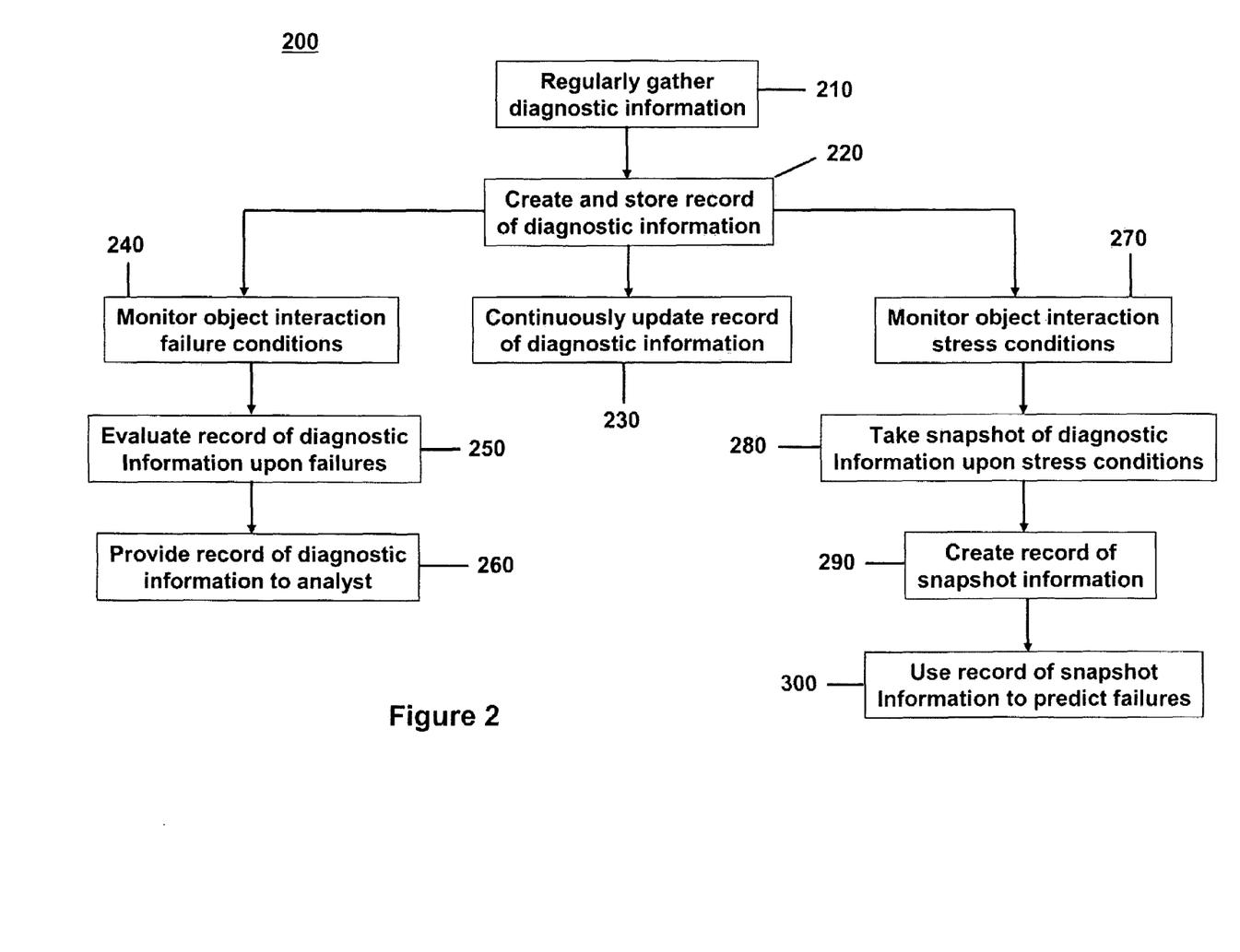
FIG. 2 is a flow chart illustrating an exemplary embodiment of a process for fault detection and prevention in a software system in accordance with the present invention is illustrated.

Referring now to FIG. 2, an exemplary embodiment of a process 200 for fault detection and prevention in a software system in accordance with the present invention is illustrated. While not limited to such an implementation, in exemplary embodiments, process 200 can be performed using the system described with reference to FIG. 1. Process 200 can begin in a state where application software, configured to detect failure conditions, is executing within the system.

Accordingly, at block 210, diagnostic information that is relevant to failures that may arise as a result of interactions between objects in the software system is regularly gathered. The diagnostic information can, for example, be generated by software objects executing on the system. While various types of diagnostic information related to multithreading and/or multitasking environments can be collected gathered at block 210 in exemplary embodiments, the diagnostic information will include at least one set of call stack information for one or more software applications that are currently running in the system, as well as at least one set of memory access information, data access information, and/or paging information for one or more running threads and/or processes.

In the present exemplary embodiment, at block 220, a record of the diagnostic information being gathered is created and stored in storage space that has been allocated for maintaining a record of this information. The storage space for the record can be, for example, a data repository or a log trace file. The length of the record allocated storage space can be determined according to configuration information that specifies, for example, a maximum size for the storage space, a maximum number of call stack changes, or a maximum length of time. For example, the storage space can maintain a record of call stack information, memory and data access information, and paging information for each thread and/or process that has been gathered over, for example, the most recent occurrence of a given time period (for example, for one minute, two minutes, five minutes, etc.) or a given number of changes in the call stack while the software system is running. The storage space for the record can be organized, for example, as a circular buffer so that when the storage space is full (for example, when the maximum size, number of call stack changes, or length of time has been reached), at block 230, the current diagnostic information being gathered at block 210 is continuously recorded over the oldest information existing in the storage space for the record. Of course, it should be understood that, in other exemplary embodiments, the storage space for the record can be implemented using any other suitable methodology such as Last In First Out (LIFO), Least Recent Used (LRU), Least Frequently Used (LFU), First In First Out (FIFO), Most Recent Used (MRU), Most Frequently Used (MFU), and a combinations thereof.

In the present exemplary embodiment, at block 240, the software system detects whether an occurrence of a failure condition related to interactions between objects within the system has occurred. Examples of detectable failure conditions can include, but are not limited to, paging problems, data access violations, memory existing in an inconsistent state, sudden impact from large resource usages, deadlock, thrashing, race conditions, and the like. In exemplary embodiments, the mechanisms for detecting and reporting failures within the software system can vary. For example, an operating system application can be configured to send a notification, such as an exception, to an application indicating that such a failure condition has occurred. Alternatively, the application software itself can be configured to detect an internal failure condition.

At block 250, whenever such a failure condition is detected, the current record of diagnostic information gathered at block 210 and maintained at blocks 220 and 230 is evaluated to attempt to localize the source of the problem. At block 260, the record of information can then be provided to a diagnostic evaluation team (for example, one or more human experts) to attempt to uniquely identify and categorize the specific interaction(s) between the objects of the system that is or are the source of the problem. In exemplary embodiments, techniques such as data mining and correlation can be utilized to sort the information in the record and/or extract relevant information from the record before the record is presented to the diagnostic evaluation team for analysis.

In the present exemplary embodiment, at block 270, the software system detects whether an occurrence of a stress condition related to interactions between objects within the system has occurred. Examples of parameters that can be monitored to detect stress conditions include CPU utilization for one or more processors, memory utilization of logical and physical memory, page file usage, disk I/O utilization, the number of processes or threads concurrently being executed, length of the wait list for data access, network throughput, etc. In exemplary embodiments, resource handles for the various system resources or condition handlers can be utilized to monitor the resources for stress conditions.

Whenever such a stress condition is detected (that is, if any of the set of monitored system resource parameters is stressed beyond a predetermined threshold), at block 280, the current record of diagnostic information gathered at block 210 and maintained at blocks 220 and 230 is accessed and utilized to take a snapshot of diagnostic information related to the components of the present system configuration and the interactions between the software objects 118 at that instant. At block 290, the snapshots taken at block 280 are used to create and maintain a record of information related to occurrences of resource stress during normal runtime operation. Finally, at block 300 the record of snapshots created at block 290 is utilized to predict and prevent system failures that are related to interactions between objects. In one exemplary embodiment, the record of snapshots can be utilized in performing regular regression testing. In alternative exemplary embodiments, the record of snapshots can be utilized to create a failure model of data clusters for system configurations during stressful conditions. For example, when enough stress condition snapshots have been generated, at block 300, the snapshot data can be extrapolated into the data clusters of the failure model according to a multivariate normal distribution to localize failure conditions within these clusters. In exemplary embodiments, the failure model of snapshot data clusters can be dynamically updated upon changes to the system configuration.

Process 200 has been described to better illustrate various aspects of exemplary embodiments of the present invention. It should be appreciated that one or more steps of process 200 can be optionally performed, or can be performed in a different order than described herein without departing from the spirit of the present invention. For instance, it is contemplated that, in exemplary embodiments, once the record of diagnostic information is created at block 220, the operations performed at blocks 230-300 can be performed both dynamically and concurrently during runtime.

The capabilities of exemplary embodiments of present invention described above can be implemented in software, firmware, hardware, or some combination thereof, and may be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general-purpose computer system with a computer program that, when being loaded and executed, controls the computer system such that it carries out the methods described herein. Exemplary embodiments of the present invention can also be embedded in a computer program product, which comprises features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Therefore, one or more aspects of exemplary embodiments of the present invention can be included in an article of manufacture (for example, one or more computer program products) having, for instance, computer usable media. The media has embodied therein, for instance, computer readable program code means for providing and facilitating the capabilities of the present invention. The article of manufacture can be included as a part of a computer system or sold separately. Furthermore, at least one program storage device readable by a machine, tangibly embodying at least one program of instructions executable by the machine to perform the capabilities of the exemplary embodiments of the present invention described above can be provided.

Figure 3:
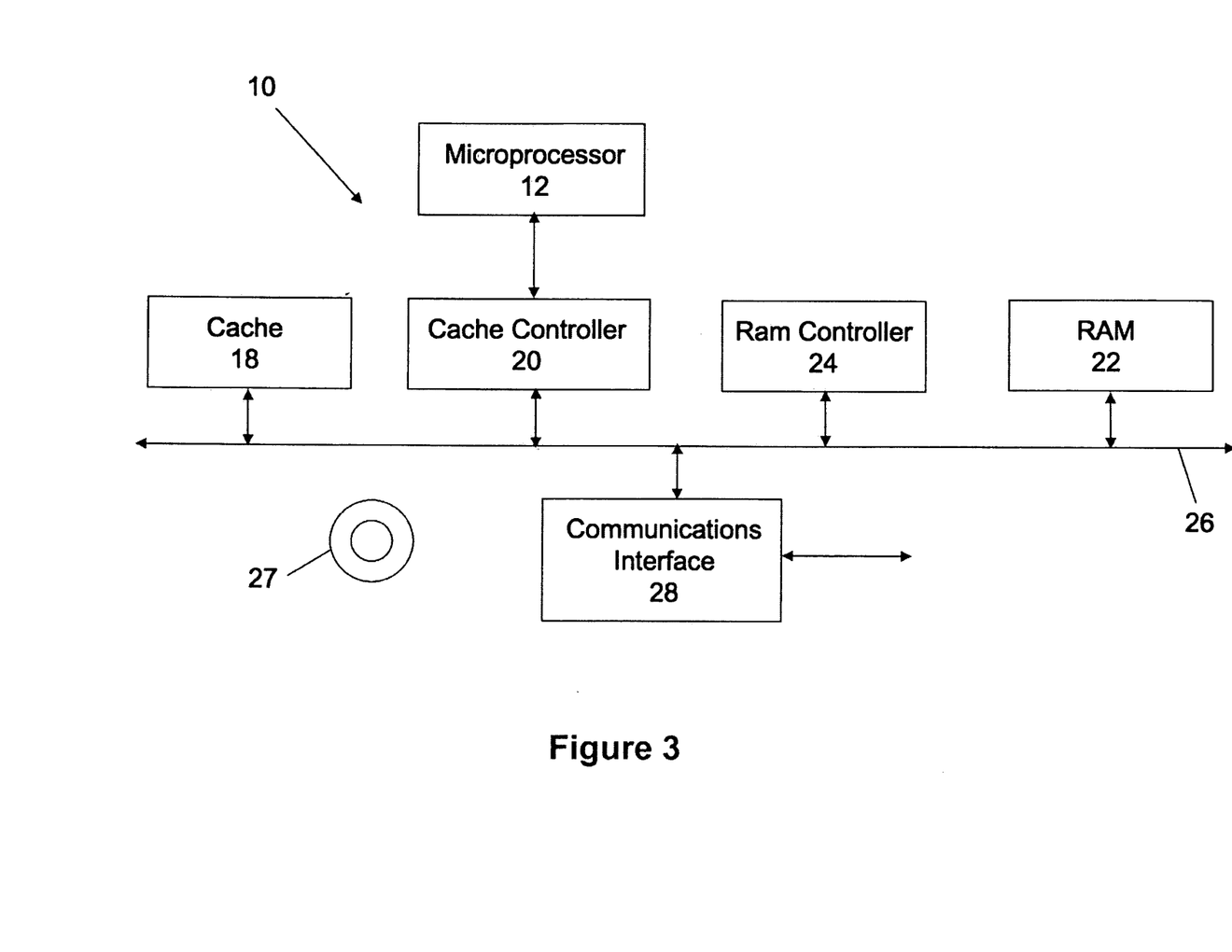
FIG. 3 is a block diagram illustrating an exemplary hardware configuration or a computer system within which exemplary embodiments of the present invention can be implemented.

For instance, exemplary embodiments of the present invention can be implemented within the exemplary embodiment of a hardware configuration provided for a computer system in FIG. 3. FIG. 3 illustrates an exemplary computer system 10 upon which exemplary embodiments of the present invention can be implemented. A processor or CPU 12 receives data and instructions for operating upon from on-board cache memory or further cache memory 18, possibly through the mediation of a cache controller 20, which can in turn receives such data from system read/write memory ("RAM") 22 through a RAM controller 24, or from various peripheral devices through a system bus 26. The data and instruction contents of RAM 22 will ordinarily have been loaded from peripheral devices such as a system disk 27. Alternative sources include communications interface 28, which can receive instructions and data from other computer systems.

The above-described program or modules implementing exemplary embodiments of the present invention can work on processor 12 and the like to perform shape interpolation. The program or modules implementing exemplary embodiments may be stored in an external storage medium. In addition to system disk 27, an optical recording medium such as a DVD and a PD, a magneto-optical recording medium such as a MD, a tape medium, a semiconductor memory such as an IC card, and the like may be used as the storage medium. Moreover, the program may be provided to computer system 10 through the network by using, as the recording medium, a storage device such as a hard disk or a RAM, which is provided in a server system connected to a dedicated communication network or the Internet.

While exemplary embodiments of the present invention have been described, it will be understood that those skilled in the art, both now and in the future, may make various modifications without departing from the spirit and the scope of the present invention as set forth in the following claims. These following claims should be construed to maintain the proper protection for the present invention.

What is claimed is:

1. A method for diagnosing failures in an object-oriented software system, the method comprising:
continually collecting runtime diagnostic information, the diagnostic information including at least one set of call stack information for at least one currently running application and at least one set of other information, each of the at least one other set of information being selected from a set of memory access information, a set of data access information, and a set of paging information for each currently executing process;

maintaining a record of the diagnostic information in a storage buffer including snap shots of any failure that occurs, wherein the snap shots are recorded at an instance resource parameters exceed a predetermined threshold related to stress conditions for runtime interactions between a set of objects in which the resource parameters include CPU utilization for one or more processors, memory utilization of logical and physical memory, page file usage disk I/O utilization, a number of processes or threads concurrently being executed, length of a data access wait list, and network throughput, and wherein the failure, related to the snap shots, includes paging problems, deadlock, thrashing, and race conditions;

identifying and categorizing the runtime interactions between the set of objects in the software system upon localizing a cause of each occurrence of the failure that is detected;

generating a failure model classified by type and category of the stress conditions from the diagnostic information;

localizing one or more failure conditions within the failure model using a multivariate normal distribution;

dynamically updating the record of the diagnostic information to include a group of the diagnostic information collected over a most recent occurrence of a predetermined interval;

dynamically updating the failure model responsive to configuration changes, wherein the record of the diagnostic information is used to reproduce the failure for diagnostics;

dynamically evaluating the collected diagnostic information to diagnose causes of failure; and providing preventative information during run time and changing operation based on the preventative information to avoid future failures.

2. The method of claim 1, further comprising monitoring the software system to detect occurrences of failures related to the runtime interactions between the set of objects in the software system, and evaluating the record of the diagnostic information to attempt to localize the cause of each occurrence of the failure that is detected, the failures related to the runtime interactions between the set of objects including one or more of data access violations, memory existing in an inconsistent state, and sudden impact from large resource usages.

3. The method of claim 2, further comprising monitoring a set of resources being utilized by the software system, and recording the snapshot of the record of the diagnostic information whenever any resource of the set of resources is being utilized beyond a specified threshold for that resource.

4. The method of claim 3, further comprising monitoring a set of resources being utilized by the software system, and recording a snapshot of the record of the diagnostic information whenever any of the set of resources is being utilized beyond a specified threshold for that resource.

5. The method of claim 4, wherein the method is performed by one or more separate processes executing within an address space of the software system, one or more threads of a process executing within the software system, one or more daemons executing within the software system, one or more services executing outside the address space of the software system, or combinations thereof.

6. The method of claim 1, wherein the diagnostic information is generated by one or more processes executing within the software system.

7. The method of claim 1, wherein the diagnostic information is generated by one or more threads of one or more processes executing within the software system.

8. The method of claim 1, wherein the software system is communicatively coupled to a data repository, and wherein the storage buffer is maintained in the data repository, such that in a state in which the storage buffer is full, the maintaining the record of the diagnostic information includes recording current diagnostic information over oldest diagnostic information existing in the storage buffer for the record.

9. The method of claim 1, wherein the record of the diagnostic information is maintained in a log trace file.

10. The method of claim 1, wherein the predetermined interval is specified according to a maximum size for the storage buffer, a maximum number of call stack changes, or a maximum period of time.

11. The method of claim 2, further comprising allowing an analyst to access the record of the diagnostic information to attempt identify and categorize the cause of each occurrence of a failure that is detected.

12. The method of claim 11, further comprising sorting and extracting information from the record of diagnostic information that is relevant to the each occurrence of a failure that is detected.

13. The method of claim 3, wherein the software system is communicatively coupled to a data repository, and wherein each snapshot of the record of diagnostic information that is recorded is maintained in a record of snapshots in the data repository.

14. The method of claim 13, further comprising utilizing the record of snapshots to predict occurrences of failures related to runtime interactions between a set of objects in the software system.

15. The method of claim 14, wherein utilizing the record of snapshots to predict occurrences of failures comprises performing regular regression testing.

16. The method of claim 14, wherein utilizing the record of snapshots to predict occurrences of failures comprises creating a failure model of data clusters for utilization conditions of the set of resources.

17. The method of claim 1, wherein the software system is an application selected from operating system applications, database management applications, server-side software applications, web-based applications, and client-side software applications.

18. The method of claim 1, wherein the software system is executing on a single processor, several processors in close proximity, or distributed across a network.

19. A system for diagnosing failures in an object-oriented software system, the system comprising:

a first software module, executed by a processor, to collect runtime diagnostic information, the diagnostic information including at least one set of call stack information for at least one currently running application in the software system, and at least one set of other information, each of the at least one set of other information being selected from a set of memory access information, a set of data access information, and a set of paging information for each currently executing process;

a storage buffer configured to maintain a record of the diagnostic information, the storage buffer being configured to automatically receive the diagnostic information collected by the first software module and dynamically update the record to include a group of the diagnostic information collected over a most recent occurrence of a predetermined interval wherein the storage buffer also receives and collects snap shots of any failure that occurs, wherein the snap shots are recorded at an instance resource parameters exceed a predetermined threshold related to stress conditions for runtime interactions between a set of objects in which the resource parameters include CPU utilization for one or more processors, memory utilization of logical and physical memory, page file usage, disk I/O utilization, a number of processes or threads concurrently being executed, length of a data access wait list, and network throughput, and wherein the failure, related to the snap shots, includes paging problems, deadlock, thrashing, and race conditions;

a failure diagnosis component for evaluating the diagnostic information record to determine diagnose causes of the failure by type; and a failure prediction component having a prevention component configured to generate a failure model classified by type and category of the stress conditions from the diagnostic information, configured to:
    identify and categorize the runtime interactions between the set of objects in the software system upon localizing a cause of each occurrence of a failure that is detected;
    localize one or more failure conditions within the failure model using a multivariate normal distribution; and
    update the failure model responsive to changes to configuration settings;
    wherein the record of the diagnostic information is used to reproduce the failure for diagnostics.

20. The diagnostic system of claim 19, further comprising a second software module configured to be notified by the software system of the each occurrence of a failure related to the runtime interactions between the set of objects in the software system, the second software module being configured to access the storage buffer to evaluate the record of the diagnostic information to attempt to localize the cause of each occurrence of a failure for which the second software module receives notification.

21. The diagnostic system of claim 20, further comprising a third software module configured to monitor a set of resources being utilized by the software system, the third software module being further configured to record a snapshot of the record of the diagnostic information whenever any resource of the set of resources is being utilized beyond a specified threshold for that resource.

22. The diagnostic system of claim 21, wherein the first, second, and third software modules are implemented within one or more libraries of functions, one or more plug-in modules, one or more dynamic link-libraries, or combinations thereof.

23. A computer having a non transitory machine usable medium including computer readable instructions stored thereon for execution by a processor to perform a method for diagnosing failures in an object-oriented software system, the method comprising:
    collecting runtime diagnostic information, the diagnostic information including at least one set of call stack information for at least one currently running application and at least one set of other information, each of the at least one set of other information being selected from a set of memory access information, a set of data access information, and a set of paging information for each currently executing process;
    maintaining a record of the diagnostic information in a storage buffer including a snap shots of any failure that occurs, wherein the snap shots are recorded at an instance resource parameters exceed a predetermined threshold related to stress conditions for runtime interactions between a set of objects in which the resource parameters include CPU utilization for one or more processors, memory utilization of logical and physical memory, page file usage, disk I/O utilization, a number of processes or threads concurrently being executed, length of a data access wait list, and network throughput, and wherein the failure, related to the snap shots, includes paging problems, deadlock, thrashing, and race conditions;

identifying and categorizing the runtime interactions between the set of objects in the software system upon localizing a cause of each occurrence of the failure that is detected;

generating a failure model classified by type and category of the stress conditions from the diagnostic information;

localizing one or more failure conditions within the failure model using a multivariate normal distribution;

dynamically updating the record of the diagnostic information to include a group of the diagnostic information collected over a most recent occurrence of a predetermined interval;

dynamically updating the failure model responsive to configuration changes, wherein the record of the diagnostic information is used to reproduce the failure for diagnostics;

evaluating the collected diagnostic information to diagnose causes of failure; and providing preventative information based on the evaluation to prevent future failures.

24. The computer-usable medium of claim 23, wherein the method further comprises monitoring the software system to detect occurrences of failures related to runtime interactions between a set of objects in the software system, and evaluating the record of the diagnostic information to attempt to localize the cause of each occurrence of the failure that is detected.

25. The computer-usable medium of claim 23, wherein the method further comprises monitoring a set of resources being utilized by the software system, and recording a snapshot of the record of the diagnostic information whenever any resource of the set of resources is being utilized beyond a specified threshold for that resource.

26. A data processing system comprising:
    a central processing unit;
    a random access memory for storing data and programs for execution by the central processing unit;
    a first storage level comprising a nonvolatile storage device; and
    computer readable instructions stored in the random access memory for execution by central processing unit to perform a method for diagnosing failures in an object-oriented software system, the method comprising:
        collecting runtime diagnostic information, the diagnostic information including at least one set of call stack information for at least one currently running application and at least one set of other information, each of the at least one set of other information being selected from a set of memory access information, a set of data access information, and a set of paging information for each currently executing process;
        maintaining a record of the diagnostic information in a storage buffer including a snap shots of any failure that occurs, wherein the snap shots are recorded at an instance resource parameters exceed a predetermined threshold related to stress conditions for runtime interactions between a set of objects in which the resource parameters include CPU utilization for one or more processors, memory utilization of logical and physical memory, page file usage, disk I/O utilization, a number of processes or threads concurrently being executed, length of a data access wait list, and network throughput, and wherein the failure, related to the snap shots, includes paging problems, deadlock, thrashing, and race conditions;

identifying and categorizing runtime interactions between a set of objects in the software system upon localizing a cause of each occurrence of a failure that is detected;

generating a failure model classified by type and category of stress conditions from the diagnostic information;

localizing one or more failure conditions within the failure model using a multivariate normal distribution;

dynamically updating the record of the diagnostic information to include a group of the diagnostic information collected over a most recent occurrence of a predetermined interval; and dynamically updating the failure model responsive to configuration changes, wherein the record of the diagnostic information is used to reproduce the failure for diagnostics;

evaluating the collected diagnostic information to diagnose causes of failure; and providing preventative information based on the evaluation to prevent future failures.

27. The data processing system of claim 26, wherein the method further comprises monitoring the software system to detect occurrences of failures related to runtime interactions between a set of objects in the software system, and evaluating the record of the diagnostic information to attempt to localize the cause of each occurrence of a failure that is detected.

28. The data processing system of claim 26, wherein the method further comprises monitoring a set of resources being utilized by the software system, and recording a snapshot of the record of the diagnostic information whenever any resource of the set of resources is being utilized beyond a specified threshold for that resource.

* * * * *